(12) United States Patent
Cui et al.

(10) Patent No.: US 11,015,664 B1
(45) Date of Patent: May 25, 2021

(54) ROTATION-ACTUATED DRUM BRAKE

(71) Applicants: Kan Cui, Mercer Island, WA (US); Margaret C. Liu, Mercer Island, WA (US); Samuel K. Liu, Mercer Island, WA (US)

(72) Inventors: Kan Cui, Mercer Island, WA (US); Margaret C. Liu, Mercer Island, WA (US); Samuel K. Liu, Mercer Island, WA (US)

(*) Notice: Subject to any disclaimer, the term of this patent is extended or adjusted under 35 U.S.C. 154(b) by 0 days.

(21) Appl. No.: 17/157,922

(22) Filed: Jan. 25, 2021

(51) Int. Cl.
| | | |
|---|---|---|
| F16D 51/00 | (2006.01) |
| F16D 53/00 | (2006.01) |
| F16D 51/12 | (2006.01) |
| F16D 49/00 | (2006.01) |
| F16D 125/40 | (2012.01) |
| F16D 121/24 | (2012.01) |
| F16D 127/02 | (2012.01) |
| F16D 125/20 | (2012.01) |

(52) U.S. Cl.
CPC ............ *F16D 53/00* (2013.01); *F16D 49/00* (2013.01); *F16D 51/00* (2013.01); *F16D 51/12* (2013.01); *F16D 2121/24* (2013.01); *F16D 2125/20* (2013.01); *F16D 2125/40* (2013.01); *F16D 2127/02* (2013.01)

(58) Field of Classification Search
CPC .......... F16D 49/00; F16D 49/16; F16D 51/00; F16D 51/12; F16D 53/00; F16D 2121/14; F16D 2125/20; F16D 2127/002
See application file for complete search history.

(56) References Cited

U.S. PATENT DOCUMENTS

| | | | | |
|---|---|---|---|---|
| 1,853,201 | A * | 4/1932 | Buscher | F16D 51/12 188/335 |
| 1,883,757 | A * | 10/1932 | Boone | F16D 51/12 188/335 |
| 2,783,858 | A | 3/1957 | Murphy | |
| 3,085,660 | A * | 4/1963 | Darling | F16D 51/12 188/335 |
| 3,357,525 | A | 12/1967 | Francois | |
| 3,853,207 | A | 12/1974 | Rist | |
| 4,007,813 | A | 2/1977 | Randol | |

(Continued)

FOREIGN PATENT DOCUMENTS

DE 102006043999 A1 * 4/2008 ............. F16D 51/00

OTHER PUBLICATIONS

Abstract for DE 102006043999 (no date).*

*Primary Examiner* — Nicholas J Lane
(74) *Attorney, Agent, or Firm* — Nath, Goldberg & Meyer; Richard C. Litman

(57) ABSTRACT

The rotation-actuated drum brake uses both inner and outer sets of brake shoes, which are actuated in a radial manner, to contact the inner and outer surfaces of a cylindrical brake drum. The inner and outer sets of brake shoes are disposed within an annular brake housing and are constrained to move radially. An actuator selectively drives rotation of a rotating disc having a plurality of arcuate slots defined therein. This drives roller guides of the inner and outer sets of brake shoes to roll within respective ones of the arcuate slots. The driven rolling of the roller guides drives the radial motion of the inner and outer sets of brake shoes to simultaneously frictionally engage the inner and outer surfaces of the cylindrical brake drum.

17 Claims, 14 Drawing Sheets

(56) References Cited

U.S. PATENT DOCUMENTS

| | | | |
|---|---|---|---|
| 4,039,052 A | | 8/1977 | Murphy et al. |
| 4,130,186 A | * | 12/1978 | de Gennes ............. F16D 53/00 |
| | | | 188/250 B |
| 4,261,445 A | * | 4/1981 | Brimaud ................ F16D 53/00 |
| | | | 188/73.32 |
| 4,913,371 A | * | 4/1990 | Margetts ............... B65H 75/44 |
| | | | 188/82.77 |
| 5,159,996 A | | 11/1992 | LeBlanc |
| 5,503,261 A | * | 4/1996 | Schultz ................. F16D 13/12 |
| | | | 192/103 B |
| 9,027,423 B1 | | 5/2015 | Cui et al. |
| 9,068,634 B2 | | 6/2015 | Cui et al. |
| 2009/0139806 A1 | * | 6/2009 | Brandt ................... F16D 51/12 |
| | | | 188/189 |

\* cited by examiner

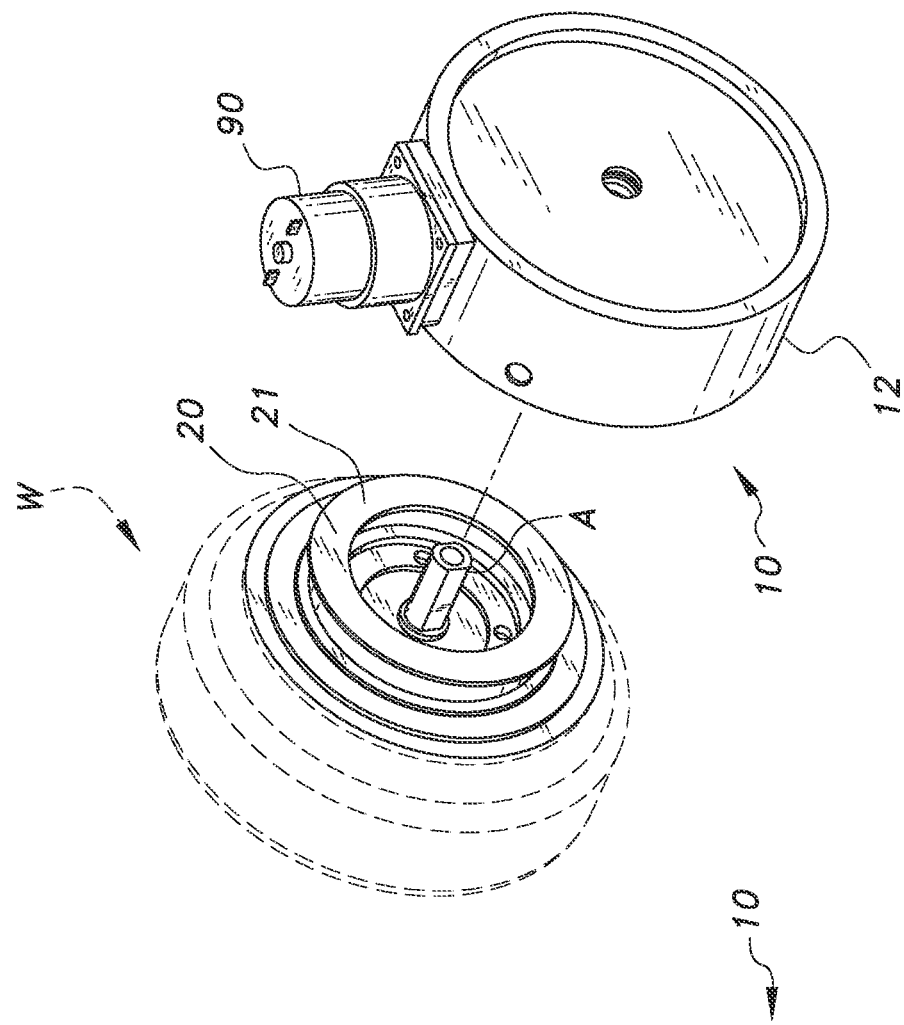
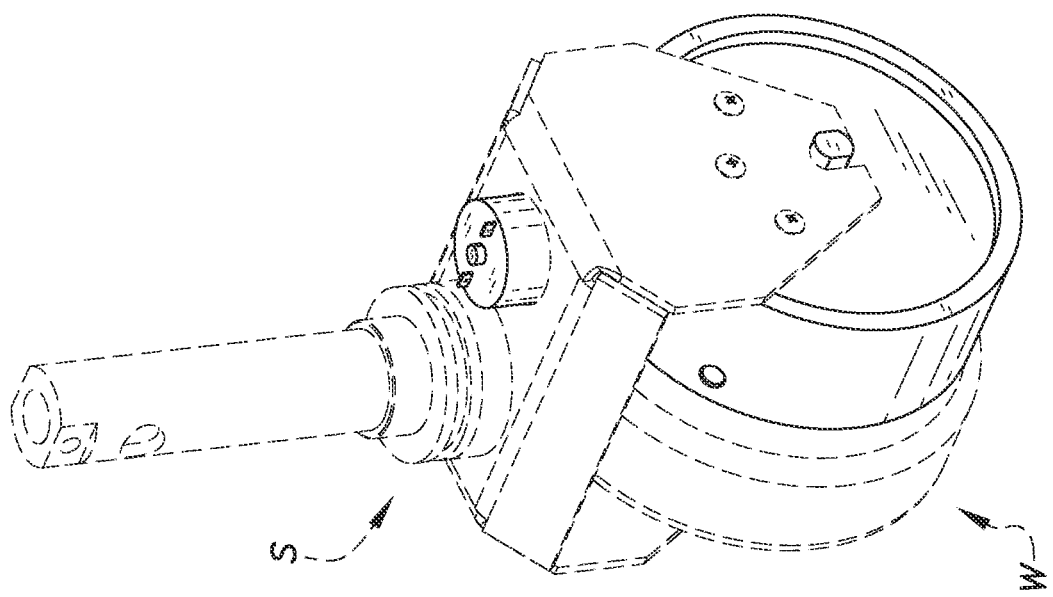
FIG. 2
FIG. 1

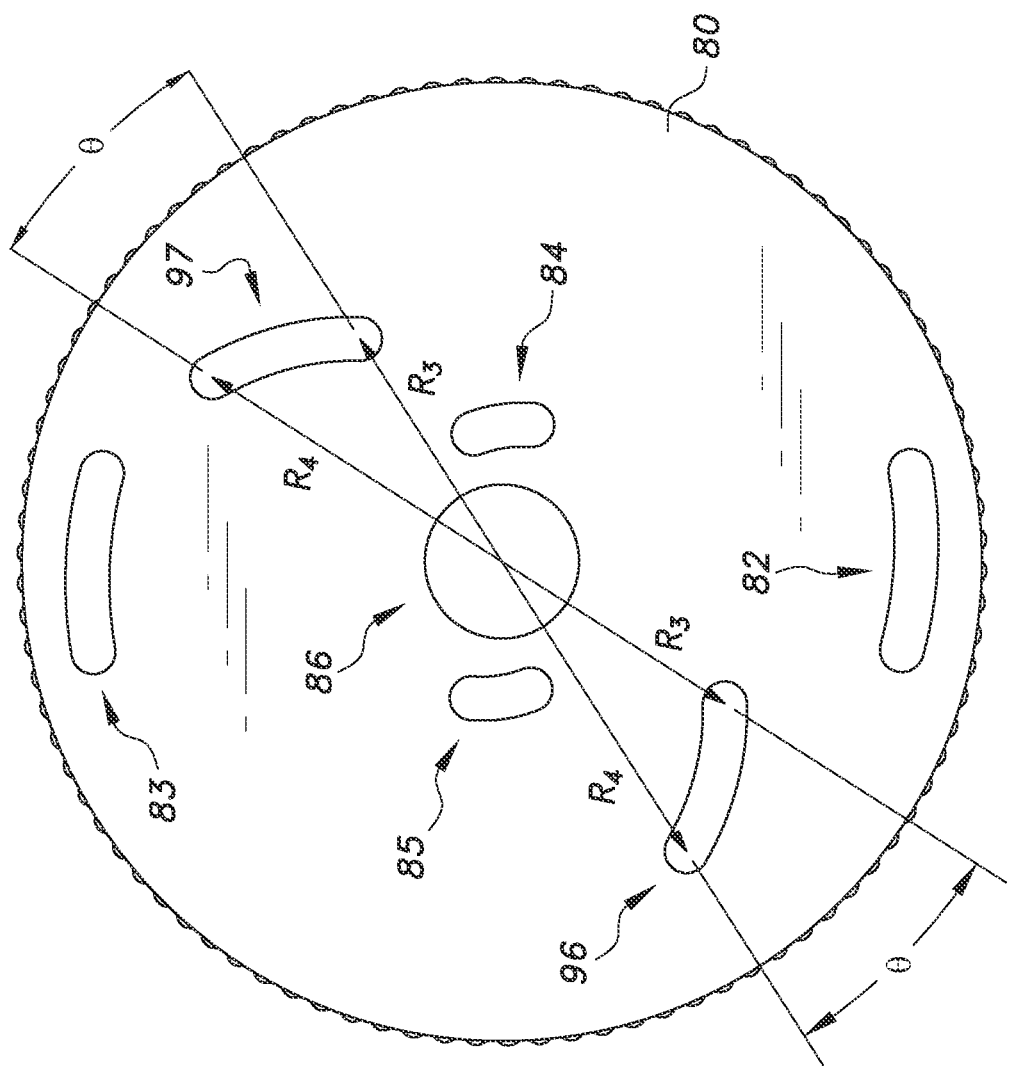

ROTATION-ACTUATED DRUM BRAKE

BACKGROUND

1. Field

The disclosure of the present patent application relates to drum brakes, and particularly to a rotation-actuated drum brake having both inner and outer brake shoes for simultaneously engaging the inner and outer surfaces of a cylindrical brake drum, respectively.

2. Description of the Related Art

Numerous types of drum brake systems make use of both inner and outer brake shoes, i.e., brake shoes that engage both the inner and outer surfaces of a cylindrical brake drum. However, in conventional systems, the inner and outer brake shoes are often applied using a pivotal movement of each brake shoe, thus making self-alignment of the brake shoes impossible. Further, in such systems, it is very difficult to have the inner and outer sets of brakes shoes engage the brake drum simultaneously, and even a slight misalignment caused by warping, general wear, or the like can throw off the timing between engagement of the two sets of brake shoes. This can lead to further misalignment, reducing the surface area of contact between each brake shoe and the brake drum, eventually causing undue and uneven wear on both the brake shoes and the brake drum. Thus, a rotation-actuated drum brake solving the aforementioned problems is desired.

SUMMARY

The rotation-actuated drum brake uses both inner and outer sets of brake shoes, which are actuated in a radial manner to contact the inner and outer surfaces of a cylindrical brake drum. The rotation-actuated drum brake includes an annular brake housing having at least one outer bore formed therein. A circular wall is mounted in the annular brake housing to divide the annular brake housing into an interior chamber and an exterior chamber. The circular wall has a central opening formed therein, and an annular rim encircles the central opening within the interior chamber. The annular rim has at least one inner bore formed therein, and the circular wall has at least one inner aperture formed therein and at least one outer aperture formed therein.

At least one inner brake shoe is provided, the at least one inner brake shoe having a shaft, a convex braking surface and a roller guide. The shaft extends through the at least one inner bore in the annular rim, and the roller guide extends through the at least one inner aperture. At least one outer brake shoe is provided, the at least one outer brake shoe having a shaft, a concave braking surface and a roller guide. The shaft of the at least one outer brake shoe extends through the at least one outer bore in the annular brake housing, and the roller guide is received by the at least one outer aperture. The roller guide and the shaft of the at least one inner brake shoe may project orthogonally with respect to one another. Similarly, the roller guide and the shaft of the at least one outer brake shoe may project orthogonally with respect to one another. Additionally, the convex braking surface of the at least one inner brake shoe may pivot with respect to the shaft of the at least one inner brake shoe about a pivot axis parallel to the roller guide of the at least one inner brake shoe. Similarly, the concave braking surface of the at least one outer brake shoe may pivot with respect to the shaft of the at least one outer brake shoe about a pivot axis parallel to the roller guide of the at least one outer brake shoe.

A rotating disc is disposed within the exterior chamber of the annular brake housing. The rotating disc has at least one arcuate inner slot formed therein for receiving the roller guide of the at least one inner brake shoe, and further has at least one arcuate outer slot formed therein for receiving the roller guide of the at least one outer brake shoe. The rotating disc also has a central opening formed therein.

A rotor sleeve is adapted for mounting on a wheel to which the rotation-actuated drum brake is to be applied. The rotor sleeve includes an annular flange, which is disposed between the at least one inner brake shoe and the at least one outer brake shoe within the interior chamber. The annular flange serves as the cylindrical brake drum. An actuator drives rotation of the rotating disc with respect to the annular brake housing. The actuator has a shaft with at least one pin extending through at least one intermediate arcuate slot formed in the rotating disc. The annular brake housing may have a pair of channels diametrically formed therein for slidably receiving the shaft of the actuator. For example, the actuator may be a linear actuator with a shaft in the form of a linear rod. Alternatively, the actuator may be a rotational actuator having a shaft including a central ring and a pair of rods diametrically attached to the central ring and projecting radially therefrom. The pair of rods may be received within the pair of channels.

In use, selective driven rotation of the rotating disc drives the at least one inner brake shoe to contact an inner surface of the rotor sleeve with the convex braking surface, and simultaneously drives the at least one outer brake shoe to contact an outer surface of the rotor sleeve with the concave braking surface. The rotating disc may be spring-biased with respect to the annular brake housing to return the rotating disc to its initial position when the actuator is not engaged.

These and other features of the present subject matter will become readily apparent upon further review of the following specification.

BRIEF DESCRIPTION OF THE DRAWINGS

FIG. 1 is an environmental perspective view of a rotation-actuated drum brake.

FIG. 2 is a partially exploded, environmental perspective view of the rotation-actuated drum brake of FIG. 1.

FIG. 11C is a plan view of the rotating disc of FIG. 6, diagrammatically showing the permitted angle of rotation of the rollers for the outer brake shoes.

Similar reference characters denote corresponding features consistently throughout the attached drawings.

DETAILED DESCRIPTION OF THE PREFERRED EMBODIMENTS

The rotation-actuated drum brake 10 uses both inner and outer sets of brake shoes, which are actuated in a radial manner to contact the inner and outer surfaces of a cylindrical brake drum. As shown in FIGS. 1 and 2, the exemplary rotation-actuated drum brake 10 is connected to a conventional self-powered traveling wheel W. However, it should be understood that the rotation-actuated drum brake 10 may be applied to any suitable type of wheel. It should be further understood that the wheel W, steering yoke S. and axle A are all shown for exemplary purposes only. As will be described in greater detail below, FIG. 2 shows a brake rotor sleeve 20 secured to the exemplary wheel W. The annular flange 21 of rotor sleeve 20 serves as the cylindrical brake drum, which, as will be described in detail below, is clamped between at least one inner brake shoe and at least one outer brake shoe when the brakes are applied.

Figure 3A:
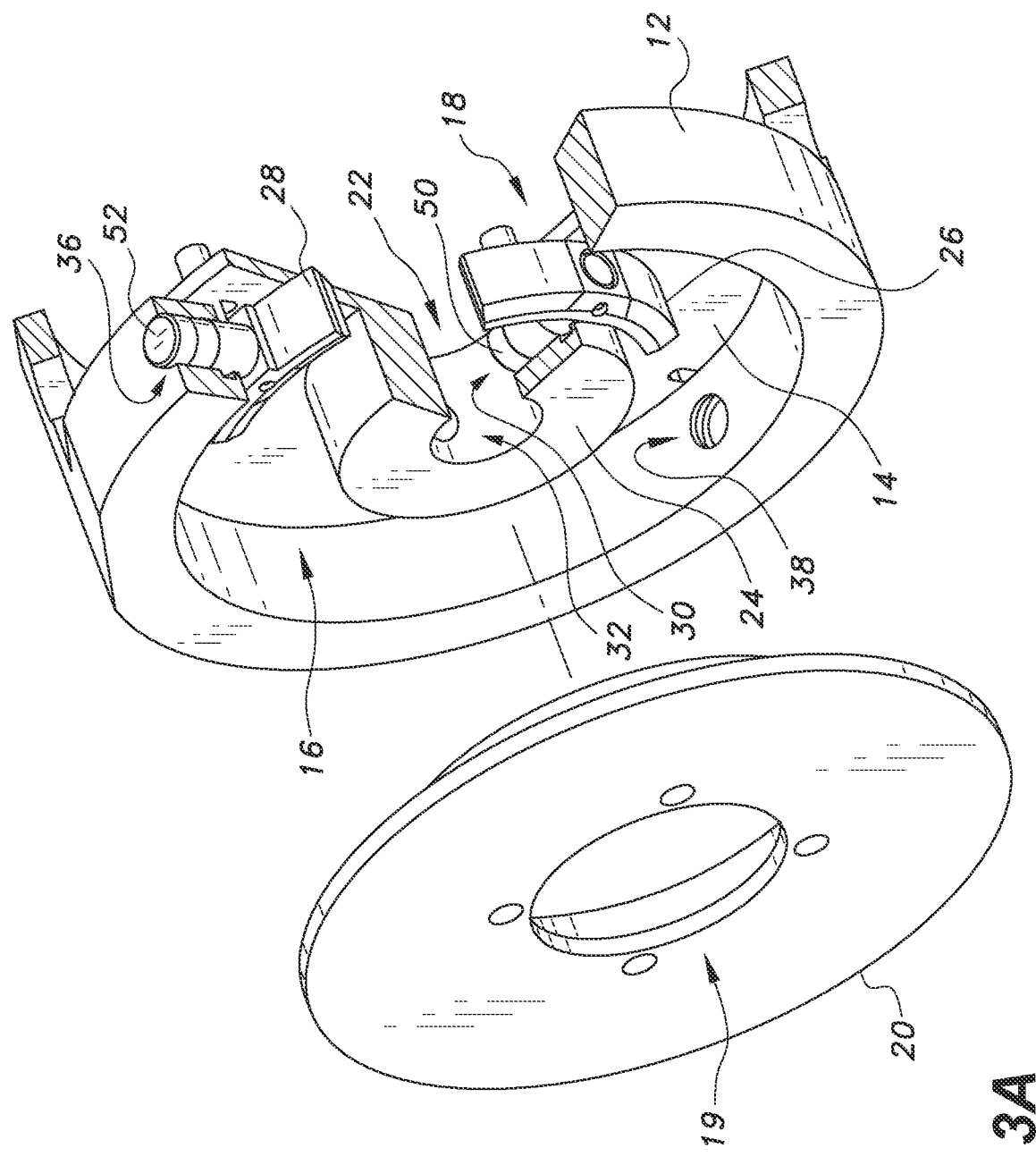
FIG. 3A is a partially exploded perspective view of the rotation-actuated drum brake of FIG. 1, partially broken away and in section, showing the interior chamber of the annular brake housing, one of the inner and one of the outer brake shoes being omitted for clarity.
Figure 3B:
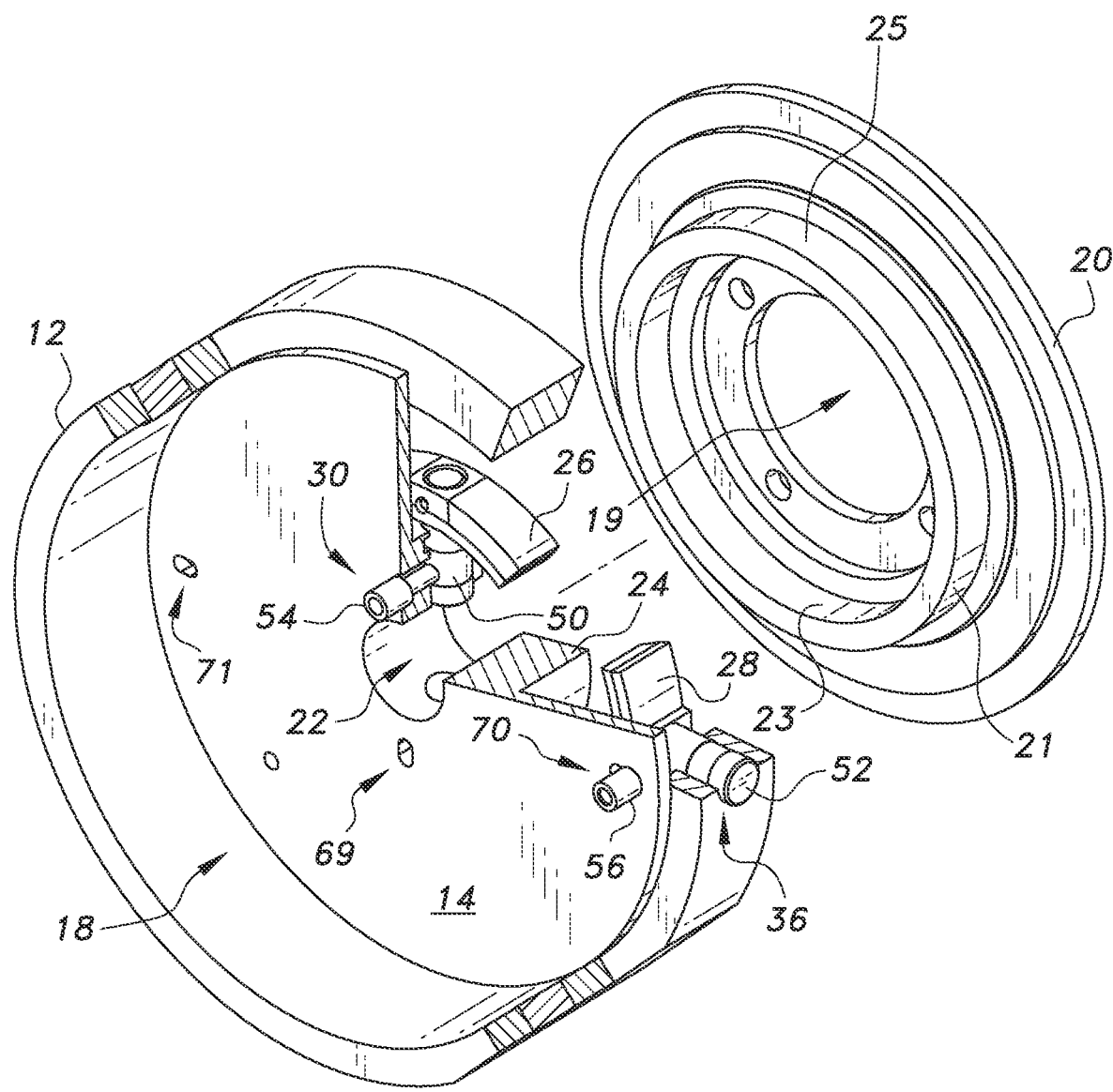
FIG. 3B is a partially exploded perspective view of the rotation-actuated drum brake of FIG. 1, partially broken away and in section, showing the exterior chamber of the annular brake housing.
Figure 3C:
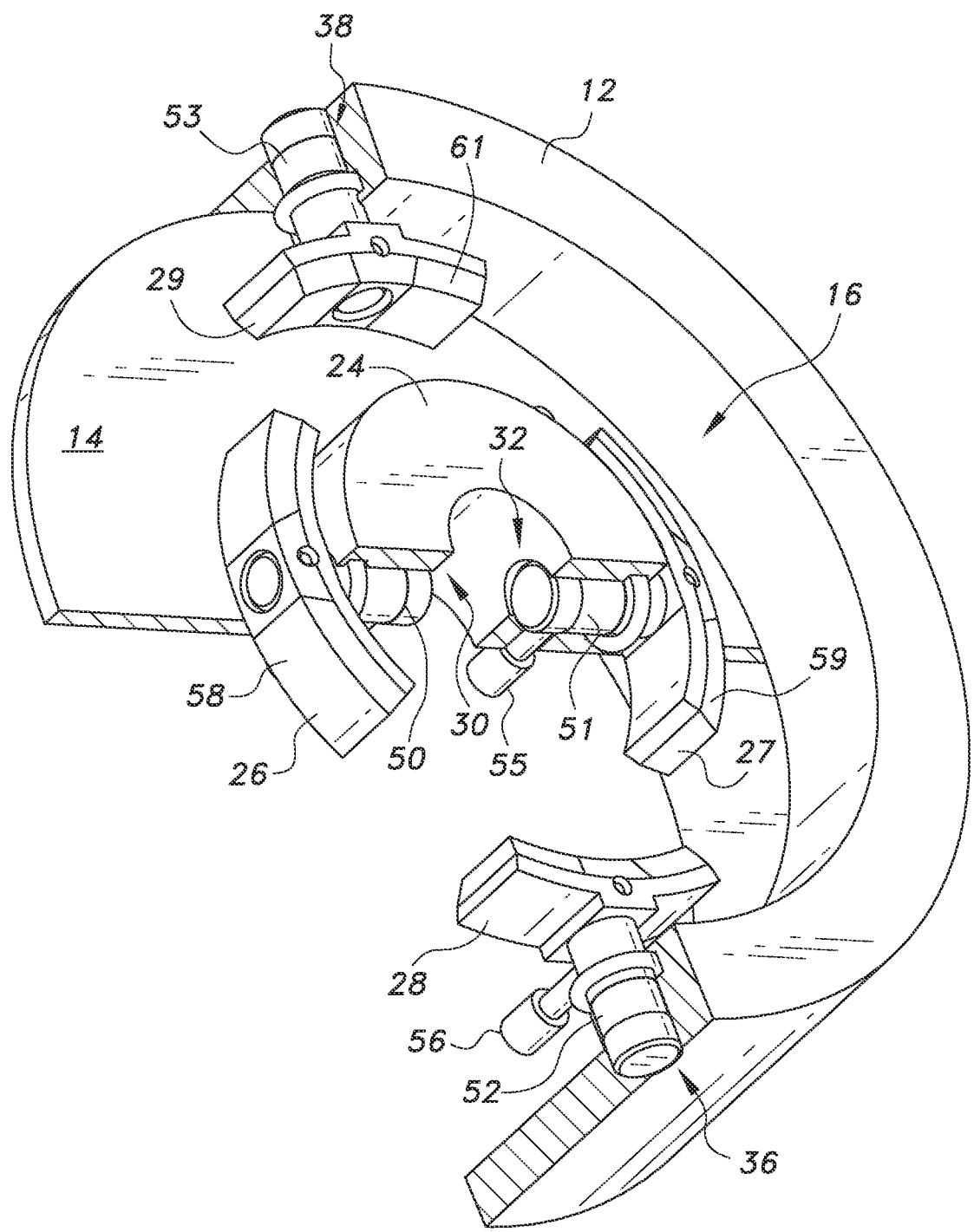
FIG. 3C is a perspective view of the rotation-actuated drum brake of FIG. 1, partially broken away and in section, showing alignment of the brake shoes in the interior chamber of the annular brake housing.

Referring to FIGS. 3A-3C, the rotation-actuated drum brake 10 includes an annular brake housing 12 having at least one outer bore formed therein. In FIGS. 3A-3C, two such outer bores 36, 38 are formed in the annular brake housing 12 and are diametrically opposed to one another. As will be discussed in greater detail below, the outer bores 36, 38 receive the shafts of the outer brake shoes 28, 29, and although only one pair of outer brake shoes 28, 29 are shown in FIGS. 3A-3C, any suitable number of outer brake shoes 28, 29 may be used. It should be understood that the relative dimensions of the annular brake housing 12 are shown in FIGS. 3A-3C for exemplary purposes only.

A circular divider wall 14 is mounted in the annular brake housing 12 to divide the annular brake housing 12 into an interior chamber 16 and an exterior chamber 18. As shown in FIGS. 3A and 3B, the interior chamber 16 faces the rotor sleeve 20 of FIG. 2. The circular wall 14 has a hub or central opening 22 formed therein for passage of the axle A of wheel W (which also projects through central opening 19 of rotor sleeve 20) through the brake housing 12, and further has a shoulder or annular rim 24 encircling the central opening 22 and extending within the interior chamber 16.

The annular rim 24 has at least one inner bore formed therein. In FIGS. 3A-3C, two such inner bores 30, 32 are formed through the annular rim 24 and are diametrically opposed to one another. As will be discussed in greater detail below, the inner bores 30, 32 receive shafts of inner brake shoes 26, 27, and although only one pair of inner brake shoes 26, 27 are shown in FIGS. 3A-3C, any suitable number of inner brake shoes 26, 27 may be used. It should be understood that the relative dimensions of the annular rim 24 are shown in FIGS. 3A-3C for exemplary purposes only. Additionally, the circular wall 14 has at least one inner oval slot formed therein and at least one outer oval slot formed therein, the oval slots extending radially. In FIGS. 3A-3C, corresponding to the exemplary pair of outer brake shoes 28, 29 and the pair of inner brake shoes 26, 27, two inner oval slots 68, 69 and two outer oval slots 70, 71 (best seen in FIG. 5) are formed through the circular wall 14.

Figure 4A:
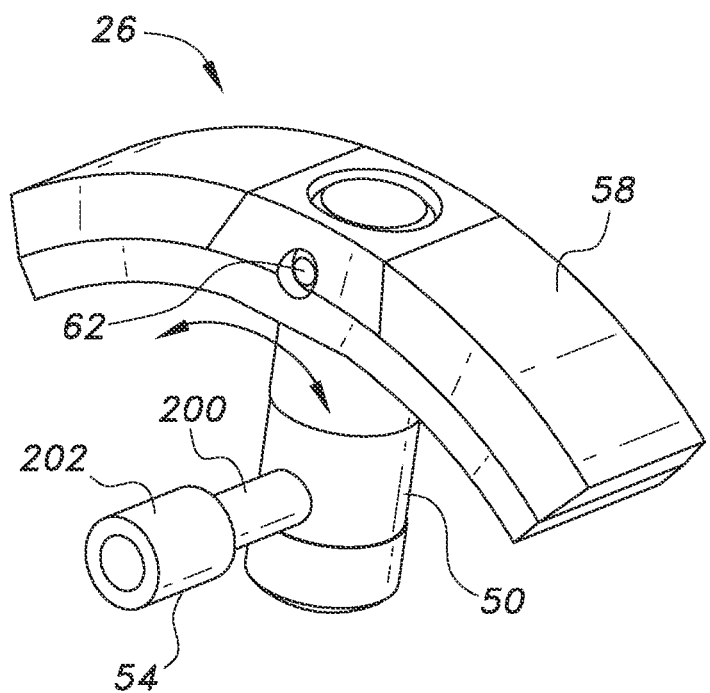
FIG. 4A is a perspective view of an inner brake shoe of the rotation-actuated drum brake of FIG. 1.

FIG. 4A shows one of the inner brake shoes 26, including a shaft 50, a convex braking surface (i.e., a brake pad surface) 58 and a roller guide 54 (the roller guide 54 including a pin 200 extending orthogonal to the shaft 50 and a freely rotatable passive roller 202 mounted on the end of the pin 200). As shown, the roller guide 54 and the shaft 50 may extend orthogonal to one another. It should be understood that the overall configuration and relative dimensions of the shaft 50, the convex braking surface 58, and the roller guide 54 are shown for exemplary purposes only. It should be further understood that in FIGS. 3A-3C and 5, the inner brake shoe 27 is substantially identical to inner brake shoe 26, having a shaft 51, a convex braking surface 59 and a roller guide 55.

Figure 10:
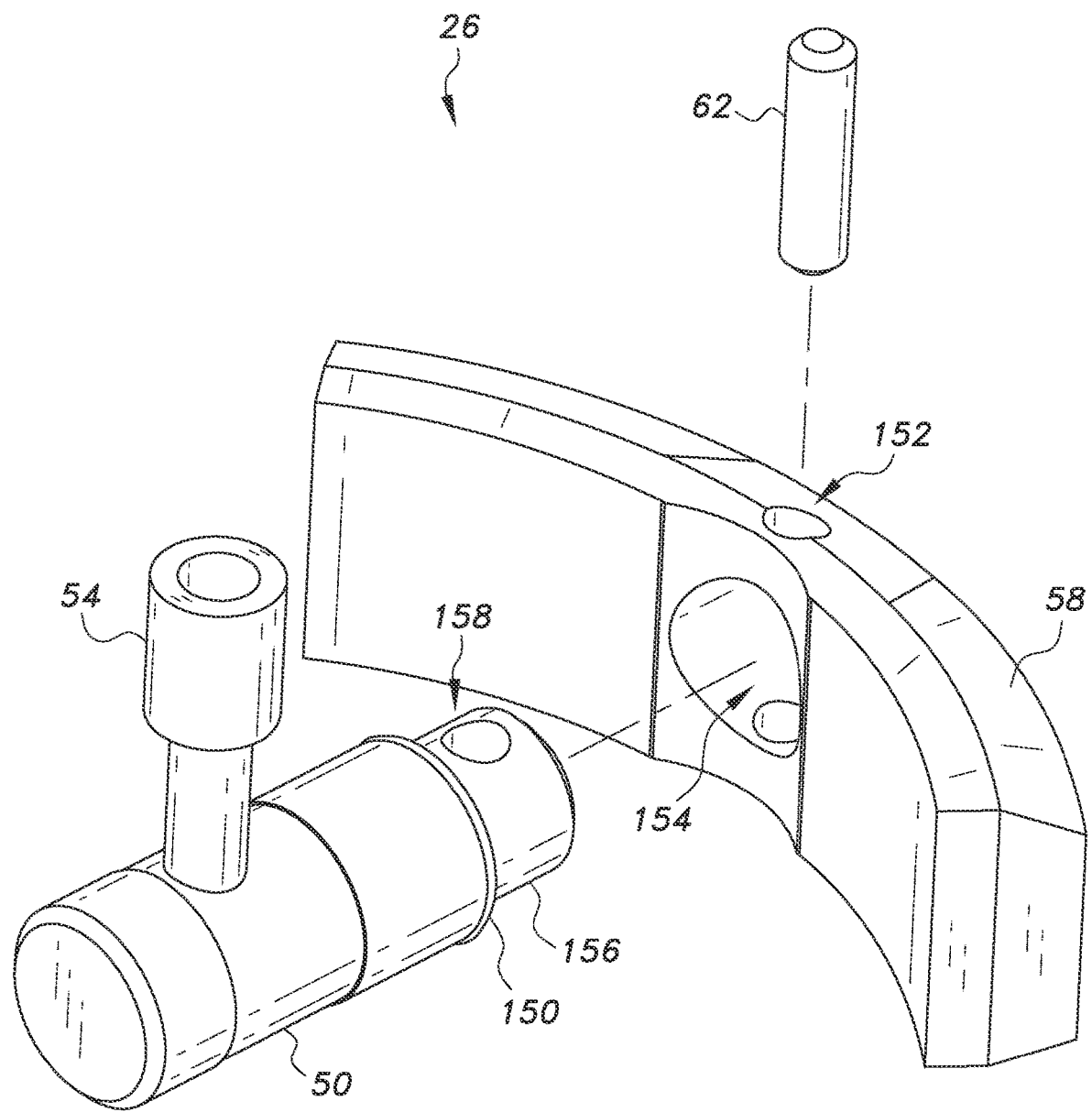
FIG. 10 is an exploded perspective view of the inner brake shoe of FIG. 4A.

As shown in FIG. 10, the convex braking surface 58 may be pivotally connected to shaft 50 via a pivot pin 62, which passes through passages 152, 154 (formed through the convex braking surface 58) and a corresponding passage 158 passing through the tip 156 of shaft 50. The tip 156 is received within a recess 154, such that the convex braking surface 58 may pivot with respect to the shaft 50 about the axis of the pivot pin 62 (which is parallel to the axis of the roller guide 54). Further, an O-ring or gasket 150 may be mounted on the shaft 50 to prevent dust or other contaminants from entering the interior chamber 16 through the inner bore. It should be understood that the inner brake shoe 27 is similarly constructed. When a braking surface (i.e., the brake pad) needs to be replaced due to wear, the corresponding pivot pin 62 can simply be removed, allowing the braking surface to easily be removed and replaced.

Figure 4B:
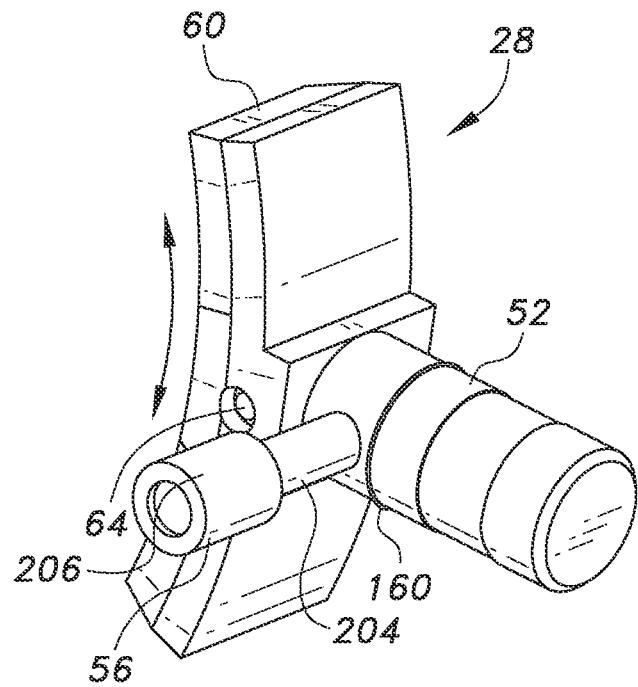
FIG. 4B is a perspective view of an outer brake shoe of the rotation-actuated drum brake of FIG. 1.

FIG. 4B shows one of the outer brake shoes 28, including a shaft 52, a concave braking surface (i.e., a brake pad surface) 60 and a roller guide 56 (the roller guide 56 including a pin 204 extending orthogonal to the shaft 52 and a freely rotatable passive roller 206 mounted on the end of the pin 204). As shown, the roller guide 56 and the shaft 52 may extend orthogonal to one another. It should be understood that the overall configuration and relative dimensions of the shaft 52, the concave braking surface 60, and the roller guide 56 are shown for exemplary purposes only. It should be further understood that in FIGS. 3A-3C and 5, the outer brake shoe 29 is substantially identical to the outer brake shoe 28, also having a shaft 53, a concave braking surface 61 and a roller guide 57. Further, as shown in FIG. 4B, an O-ring or gasket 160 may be mounted on the shaft 52 to prevent dust or other contaminants from entering the interior chamber 16 through the outer bore. It should be further understood that the concave braking surfaces 60, 61 may pivot about their respective shafts 52, 53 in a manner similar to that described above for inner brake shoe 26 of FIG. 10.

As shown in FIGS. 3A-3C and 5, the shafts 50, 51 of the inner brake shoes 26, 27 are slidably disposed within inner bores 30, 32, and the shafts 52, 53 of the outer brake shoes 28, 29 are slidably disposed within outer bores 36, 38, constraining the inner brake shoes 26, 27 and the outer brake shoes 28, 29 to reciprocating motion radially. Further, roller guides 54, 55 of inner brake shoes 26, 27 extend through the inner oval slots 68, 69 of circular wall 14, respectively, and roller guides 56, 57 of outer brake shoes 28, 29 extend through the outer oval slots 70, 71, respectively. (The pin 200, 204 portions of the roller guides 54-57 are slidably disposed in the oval slots 68-71, and the roller 202, 206 portions are mounted on the ends of the pins on the opposite side of the circular divider wall 14, constraining the lower portions of the shafts 50, 52 to reciprocating motion in the radial direction.)

Figure 5:
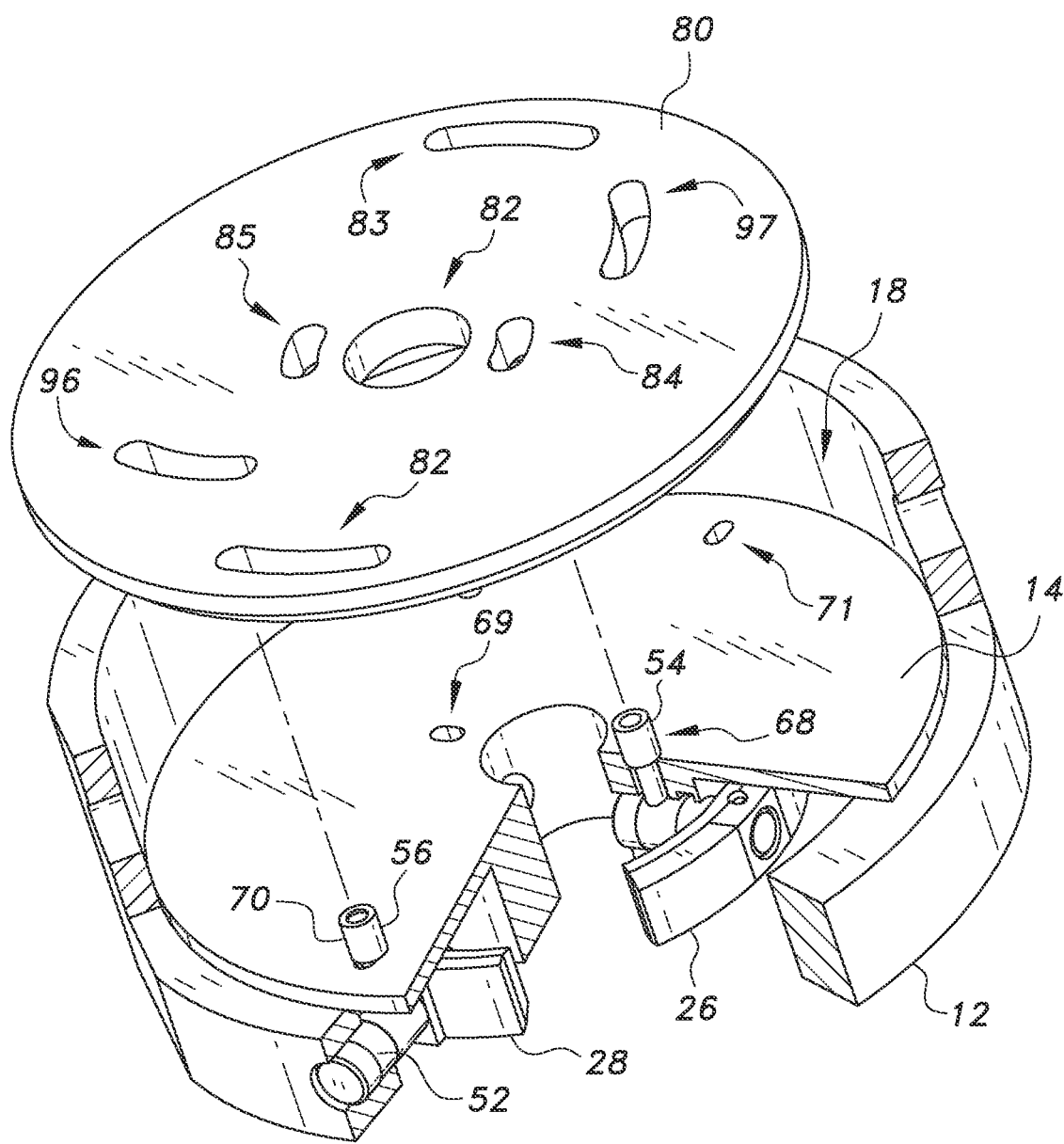
FIG. 5 is a partially exploded perspective view of the rotation-actuated drum brake of FIG. 1, partially broken away and in section, showing the rotating disc in the outer chamber of the annular brake housing.
Figure 6:
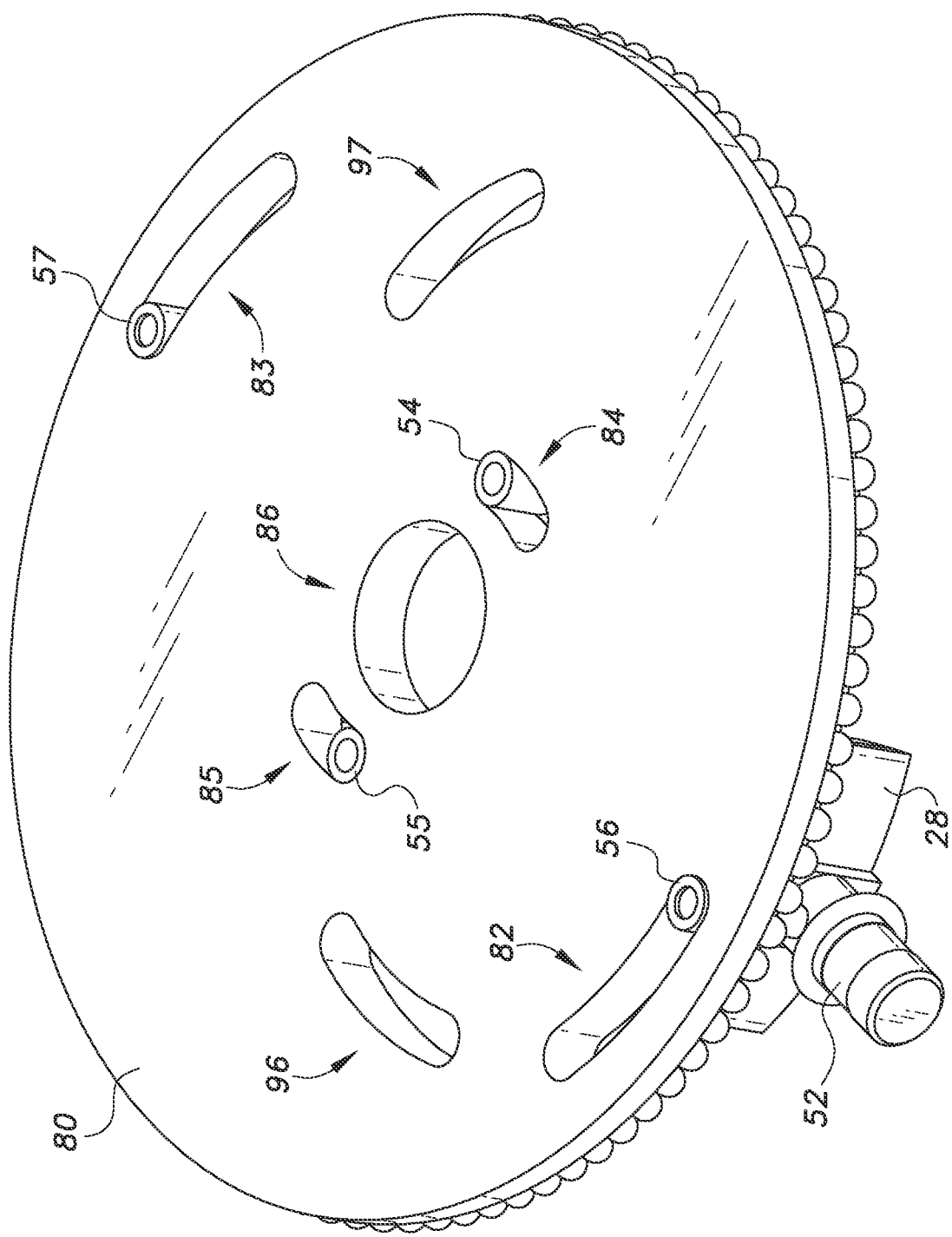
FIG. 6 is a perspective view of the rotating disc of the rotation-actuated drum brake of FIG. 1.

As shown in FIGS. 5 and 6, a rotating disc 80 is disposed within the exterior chamber 18 of the annular brake housing 12. The rotating disc 80 has at least one arcuate inner slot 84 formed therein for receiving the roller 202 portion of the roller guide 54 of the at least one inner brake shoe 26, and further has at least one arcuate outer slot 97 formed therein for receiving the roller 206 portion of the roller guide 56 of the at least one outer brake shoe 28. In FIGS. 3A-3C, 5 and 6, the rotating disc 80 has a pair of arcuate inner slots 84, 85 for receiving roller guides 54, 55 of inner brake shoes 26, 27, respectively, and a pair of arcuate outer slots 82, 83 for receiving roller guides 56, 57 of outer brake shoes 28, 29, respectively. As will be discussed in greater detail below, a pair of intermediate arcuate slots 96, 97 are also formed through rotating disc 80. The rotating disc 80 also has a central opening 86 formed therein for receiving the axle A of wheel W.

Returning to FIG. 3B, the rotor sleeve 20 includes an annular flange 21, which extends between the inner brake shoes 26, 27 and the outer brake shoes 28, 29 within the interior chamber 16. Thus, when the rotor sleeve 20 is seated in the interior chamber 16, the inner brake shoes 26, 27 can selectively frictionally engage the inner surface 23 of the annular flange 21 when the brakes are applied, and simultaneously the outer brake shoes 28, 29 can frictionally engage the outer surface 25 of the annular flange 21 when the brakes are applied, the annular flange 21 acting as a conventional cylindrical brake drum.

Figure 7:
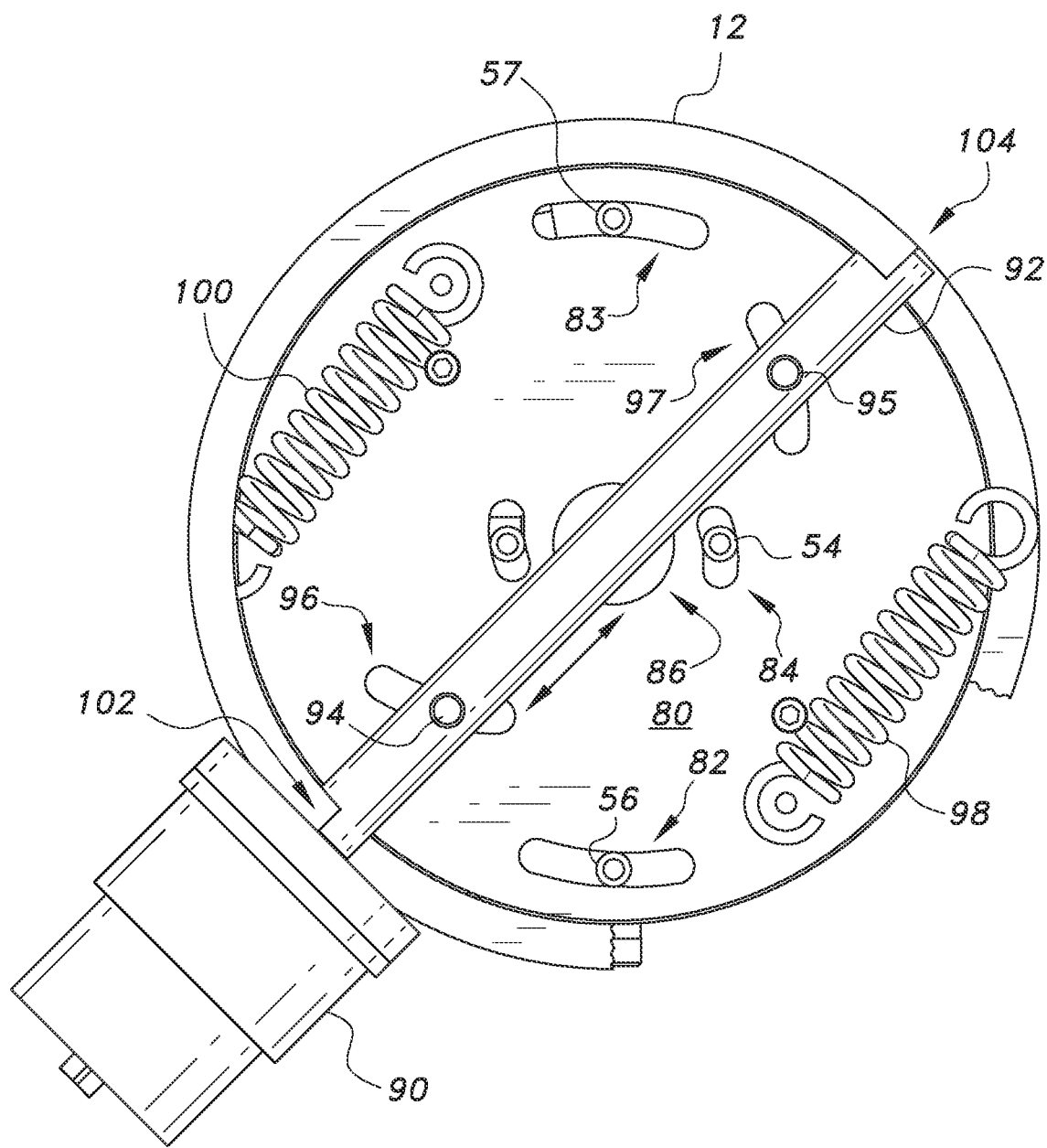
FIG. 7 is a front view of the exterior chamber of the annular brake housing of the rotation-actuated drum brake of FIG. 1, showing a linear actuator extending diametrically across the chamber outside the rotating disc.

An actuator is used to drive rotation of the rotating disc 80 with respect to the annular brake housing 12 to apply the brakes. In FIG. 7, an exemplary linear actuator 90 is shown with a shaft 92 in the form of a linear rod. At least one pin extends from the shaft 92. In FIG. 7, which corresponds to the structure of FIGS. 3A-3C, 5 and 6, a pair of pins 94, 95 are mounted on the shaft 92 and extend through the pair of intermediate arcuate slots 96, 97 formed in the rotating disc 80 so that the disc 80 rotates when the shaft 92 extends or retracts. As shown, the annular brake housing 12 may have a pair of channels 102, 104 diametrically formed therein for slidably receiving the shaft 92, which is constrained to slide back and forth along its axis (i.e., along the diameter of the rotating disc 80).

Figure 8:
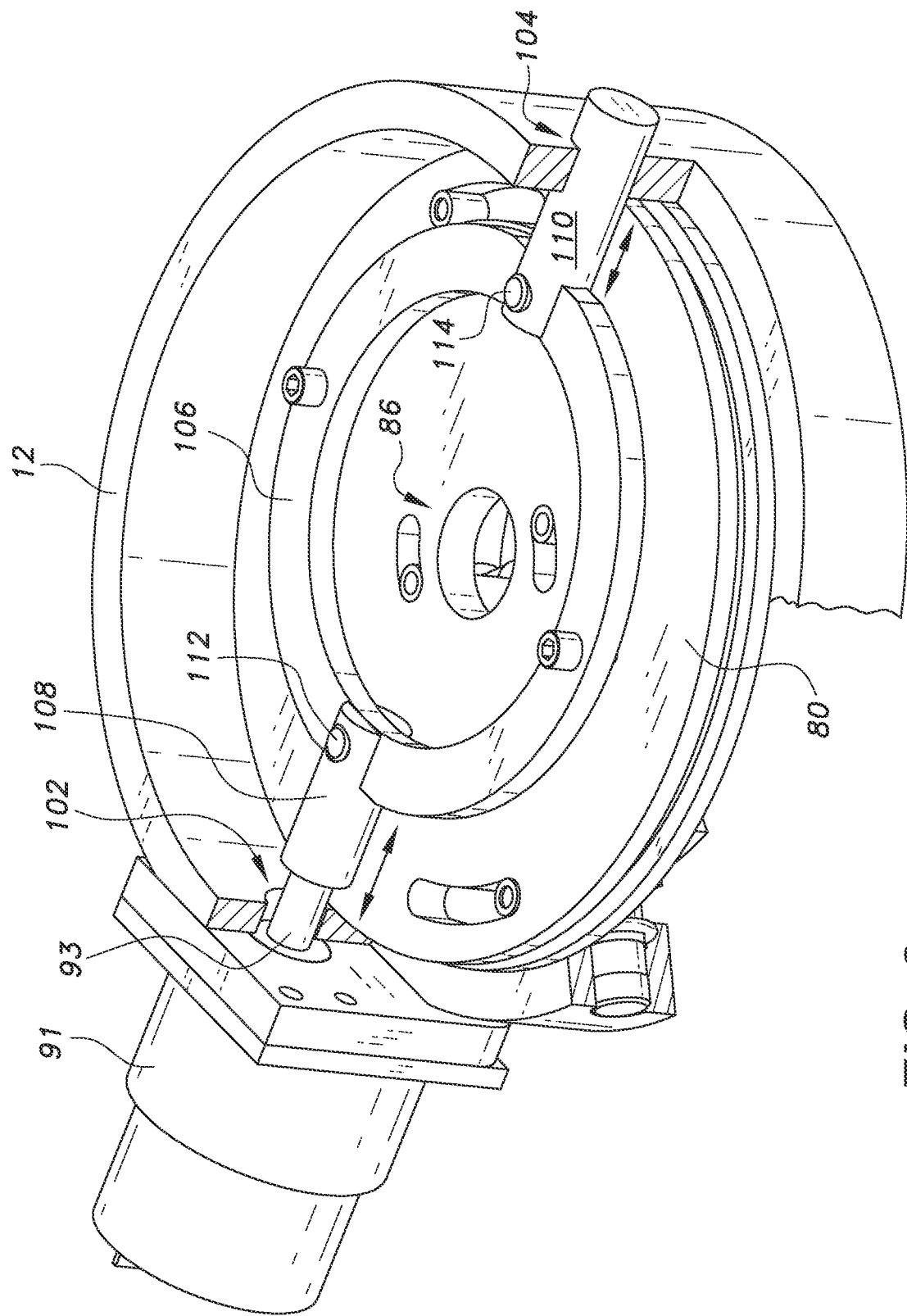
FIG. 8 is a perspective view of an alternative embodiment of the rotation-actuated drum brake, partially broken away and in section, showing a rotational actuator for actuating the brakes.

FIG. 8 illustrates an alternative actuator where the linear actuator 90 of FIG. 7 is replaced by a rotary actuator 91 (which may be a step motor). The rotary actuator 91 has a rotary shaft 93 that is externally threaded at its distal end. The threaded end of the rotary shaft engages an internally threaded socket in the end of a rod 108 attached to a central ring 106, thereby extending the ring 106 linearly away from the rotary actuator 91 or retracting the ring towards the linear actuator 91 by a screw-drive mechanism. The ring 106 has a second rod 110 extending away from the ring diametrically opposite rod 108. The pair of rods 108, 110 are slidably disposed within the pair of channels 102, 104 in the brake housing 12, constraining the ring to reciprocating movement. Pins 94, 95 of FIG. 7 are replaced by a corresponding pair of pins 112, 114, which extend orthogonally from the respective junctions between the rods 108, 110 and the central ring 106. The central ring 106 provides clearance for the axle A of the wheel W, which projects through the central opening 86 in the rotating disc 80.

The driven reciprocal motion of the linear actuator shaft 92 (or the rod 108 driven by the rotary actuator shaft 93) drives corresponding back and forth rotation of the rotating disc 80 through the sliding of pins 94, 95 (or pins 112, 114) within intermediate arcuate slots 96, 97. When the shaft 92 is slid outward (i.e., toward channel 104), rotating disc 80 is driven to rotate, which, in turn, causes the inner brake shoes 26, 27 to frictionally engage the inner surface 23 of the annular flange 21 of the rotor sleeve 20. This radial movement of the inner brake shoes 26, 27 is driven by their respective roller guides 54, 55 rolling within the arcuate inner slots 84, 85. Simultaneously, the outer brake shoes 28, 29 are driven radially to frictionally engage the outer surface 25 of the annular flange 21 by their respective roller guides 56, 57 rolling within the arcuate outer slots 82, 83. The rotating disc 80 may be spring-biased with respect to the annular brake housing 12 to return the rotating disc 80 to its initial position when the actuator is disengaged (shown in FIG. 7 by a pair of exemplary springs 98, 100). The inner surface 23 of the annular flange 21 may have an annular recess or annular groove defined therein for securely receiving the convex braking surface of the corresponding one of the inner brake shoes 26, 27 (which has a radius of curvature identical to that of the inner surface 23). Similarly, the outer surface 25 of the annular flange 21 may have an annular recess or annular groove defined therein for securely receiving the concave braking surface of the corresponding one of the outer brake shoes 27, 28 (which has a radius of curvature identical to that of the outer surface 25).

Figure 9:
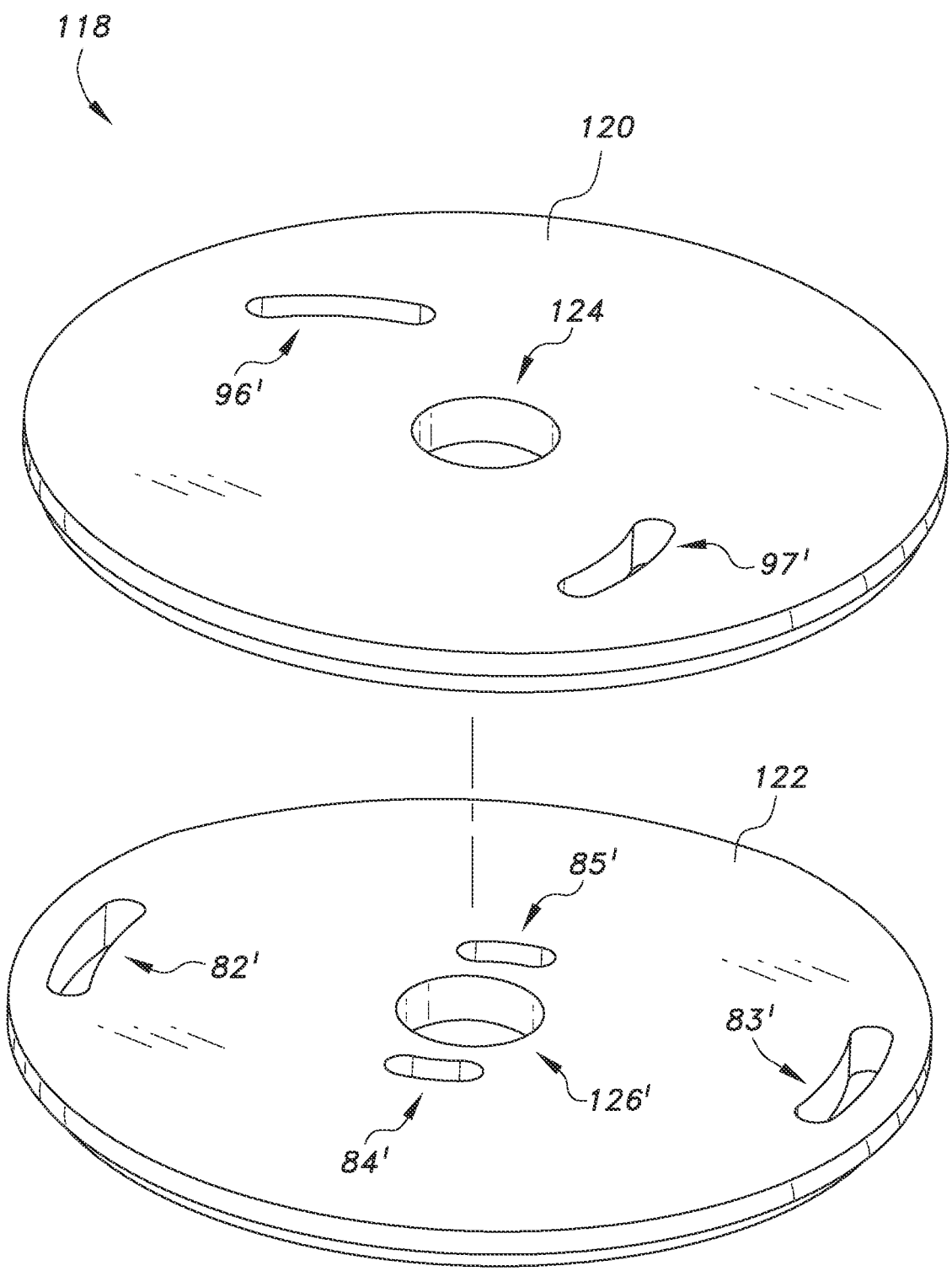
FIG. 9 is an exploded perspective view of an alternative embodiment of the rotating disc of FIG. 6, split into two discs rigidly attached together.

As shown in FIG. 9, the rotating disc 80 may be replaced by an alternative rotating disc 118, which is manufactured as a pair of separate discs 120, 122 which are rigidly attached to each other after formation of each disc 120, 122. Rather than having all of the arcuate slots formed in a single disc (as with rotating disc 80), disc 120 may have a central opening 124 and a pair of arcuate intermediate slots 96', 97' defined therein. When fully assembled, these slots 96', 97' are combined with a pair of arcuate inner slots 84', 85' and a pair of arcuate outer slots 82', 83', as well as a central opening 126, of the mating disc 122.

Figure 11A:
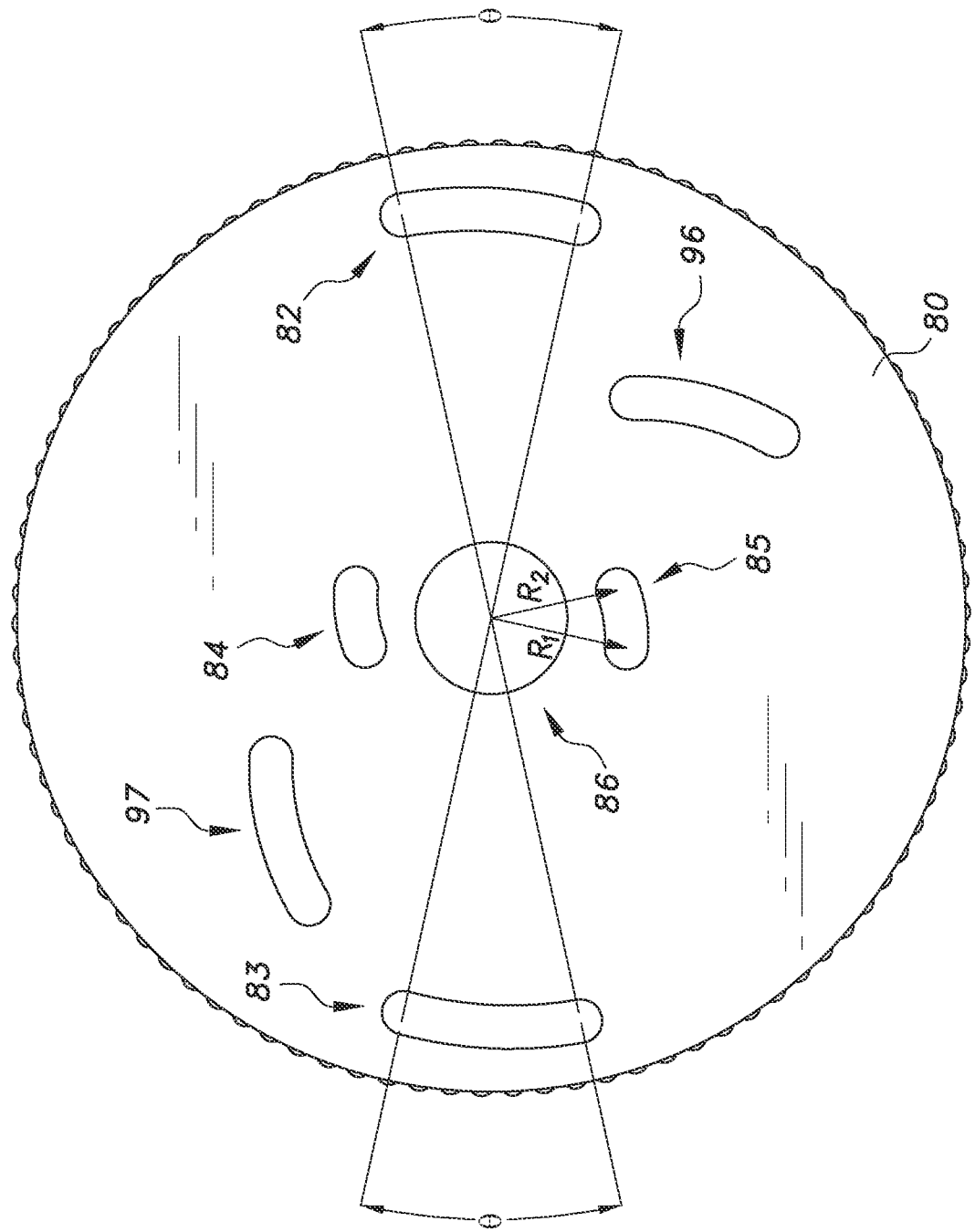
FIG. 11A is a plan view of the rotating disc of FIG. 6, diagrammatically showing the permitted angle of rotation of the rotating disc.
Figure 11B:
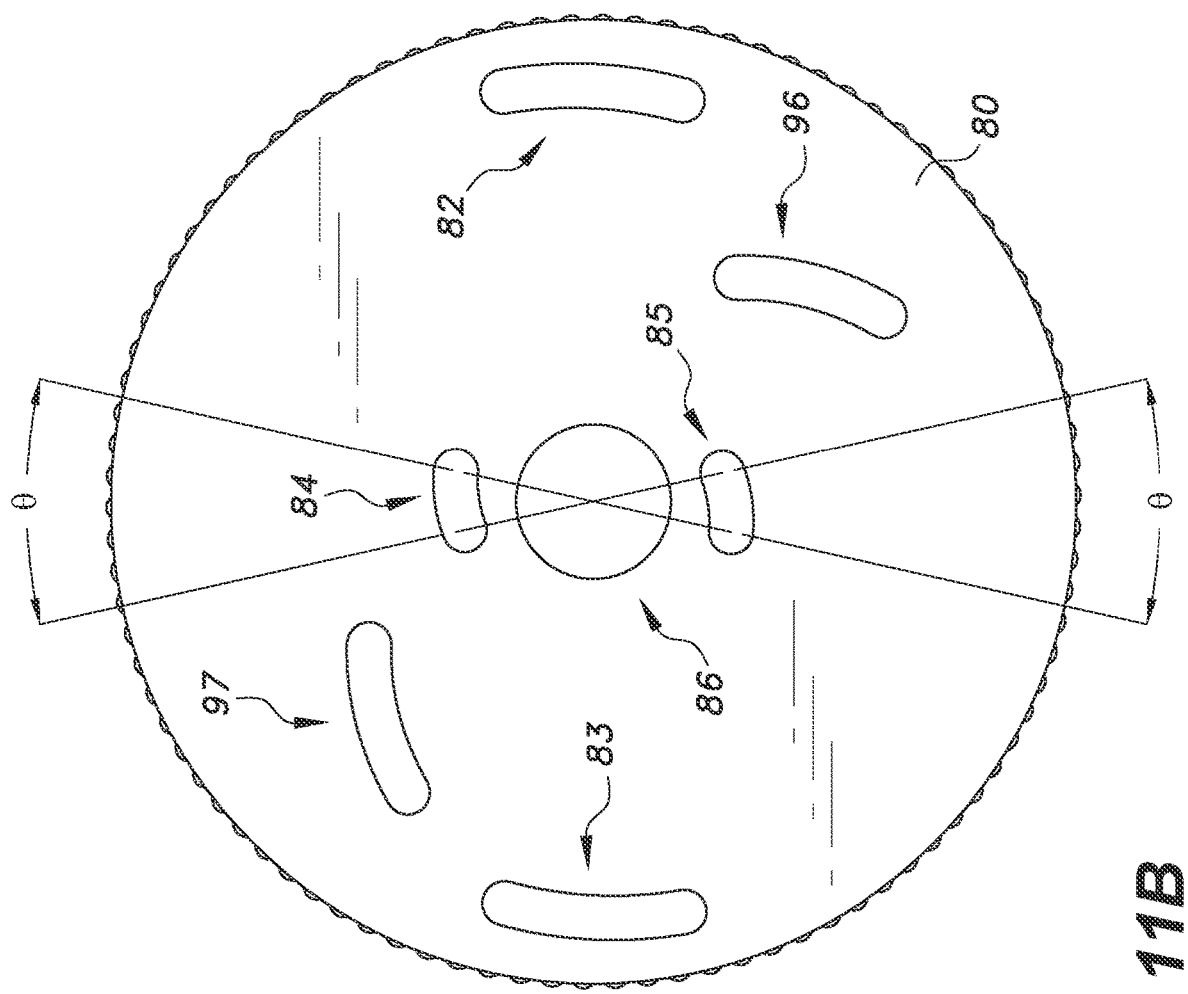
FIG. 11B is a plan view of the rotating disc of FIG. 6, diagrammatically showing the permitted angle of rotation of the rollers for the inner brake shoes.

As shown in FIGS. 11A-11C, the pair of arcuate inner slots 84, 85 are diametrically opposed and, similarly, the pair of arcuate outer slots 82, 83 are also diametrically opposed. However, the pair of intermediate arcuate slots 96, 97 are asymmetric with respect to a diametric axis of the rotating disc 80. Taken with respect to the center of central opening 86, each of the arcuate inner slots 84, 85 spans an angle θ, and each of the arcuate outer slots 82, 83 spans the same angle θ. However, as shown in FIG. 11A, the two ends of each of arcuate inner slots 84, 85 are not at the same distance from the center of central opening 86, i.e., $R_1 \neq R_2$. As the actuator is engaged, the corresponding roller guide travels from the smaller radius $R_1$ to the larger radius $R_2$ across the angular span θ. However, as noted above, the pair of intermediate arcuate slots 96, 97 are asymmetric. Thus, as pin 94 travels from the smaller radius $R_3$ to the larger radius $R_4$ (see FIG. 11C) within the intermediate arcuate slot 96, pin 95 will travel from larger radius $R_4$ to smaller radius $R_3$ within the intermediate arcuate slot 97. This allows a constant distance to be maintained between pins 94 and 95, corresponding to the fixed distance required by either linear actuator shaft 92 or alternative linkage for the rotary actuator 91 shown in FIG. 8.

It is to be understood that the rotation-actuated drum brake is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A rotation-actuated drum brake, comprising:
   an annular brake housing having at least one outer bore defined therein;
   a circular divider wall mounted in the annular brake housing defining an interior chamber and an exterior chamber within the annular brake housing, the circular wall having a central opening, at least one inner radially extending slot, and at least one outer radially extending slot defined therein, the central opening having an annular rim extending within the interior chamber, the annular rim having at least one inner bore defined therein;
   at least one inner brake shoe disposed in the interior chamber of the brake housing, the at least one inner brake shoe having a shaft, a convex braking surface and a roller guide, the roller guide including a pin extending orthogonal to the shaft and through the at least one inner radially extending slot in the circular wall and a freely rotatable roller mounted on the pin in the exterior chamber, a portion of the shaft of the at least one inner brake shoe being slidably disposed in the at least one inner bore defined in the annular rim;
   at least one outer brake shoe disposed in the interior chamber of the brake housing, the at least one outer brake shoe having a shaft, a concave braking surface and a roller guide, the roller guide including a pin extending orthogonal to the shaft and through the at least one outer radially extending slot in the circular wall and a freely rotatable roller mounted on the pin in the exterior chamber, a portion of the shaft of the at least one outer brake shoe being slidably disposed in the at least one outer bore in the brake housing;
   a rotating disc disposed within the exterior chamber of the annular brake housing, the rotating disc having:
      at least one arcuate inner slot defined therein, the roller of the at least one inner brake shoe being disposed in the at least one arcuate inner slot to roll therein;
      at least one arcuate outer slot defined therein, the roller of the at least one outer brake shoe being disposed in the at least one arcuate outer slot to roll therein; and
      a central opening defined therein aligned with the central opening in the circular divider wall;
   a rotor sleeve adapted for mounting on a wheel, the rotor sleeve having an annular flange extending into the interior chamber in the brake housing between the at least one inner brake shoe and the at least one outer brake shoe, the annular flange having an inner surface and an outer surface; and
   an actuator mounted on the annular brake housing for driving rotation of the rotating disc with respect to the annular brake housing, selective rotation of the rotating disc driving the at least one inner brake shoe to frictionally engage the inner surface of the annular flange of the rotor sleeve with the convex braking surface, and simultaneously driving the at least one outer brake shoe to frictionally engage the outer surface of the annular flange of the rotor sleeve with the concave braking surface in order to stop rotation of the wheel.

2. The rotation-actuated drum brake as recited in claim 1, further comprising a pivot pin attaching the convex braking surface of the at least one inner brake shoe to the shaft of the at least one inner brake shoe about a pivot axis parallel to the roller guide of the at least one inner brake shoe.

3. The rotation-actuated drum brake as recited in claim 1, further comprising a pivot pin attaching the concave braking surface of the at least one outer brake shoe to the shaft of the at least one outer brake shoe about a pivot axis parallel to the roller guide of the at least one outer brake shoe.

4. The rotation-actuated drum brake as recited in claim 1, wherein said rotating disc has at least one intermediate slot defined therein and the actuator comprises a linear actuator mounted on said annular brake housing, the linear actuator having a selectively extendable and retractable shaft and at least one pin extending from the shaft into the at least one intermediate arcuate slot in the rotating disc, whereby extension and retraction of the actuator shaft selectively rotates the rotating disc to apply and release the brakes.

5. The rotation-actuated drum brake as recited in claim 4, wherein the annular brake housing has a pair of channels defined therein diametrically opposite each other, the shaft of said linear actuator extending through both of the channels and being slidable therein.

6. The rotation-actuated drum brake as recited in claim 1, further comprising at least one spring extending between said brake housing and said rotating disc, the at least one spring biasing said rotating disc to retract said brake shoes when said actuator is not selectively driving said brake shoes to frictionally engage the annular flange of said rotor sleeve.

7. The rotation-actuated drum brake as recited in claim 1, wherein said rotating disc has at least one intermediate slot defined therein and the actuator comprises a rotary actuator mounted on said annular brake housing, the rotary actuator having a shaft extending therefrom, the shaft being selectively rotatable in clockwise and counterclockwise directions and having an externally threaded free end, the rotation-actuated drum brake further comprising:
   a linking rod having an internally threaded socket defined therein, the externally threaded end of the rotary actuator shaft engaging the socket to linearly extend and retract the linking rod;
   a ring attached to the linking rod opposite the socket;
   a guide rod extending from the ring diametrically opposite the linking rod; and
   at least one pin extending from the ring into the at least one intermediate arcuate slot in the rotating disc, whereby rotation of the rotary actuator shaft selectively reciprocates the ring and rotates the rotating disc to apply and release the brakes.

8. The rotation-actuated drum brake as recited in claim 7, wherein the annular brake housing has a pair of channels defined therein diametrically opposite each other, the linking rod and the guide rod being slidably disposed in a corresponding one of the channels, respectively.

9. The rotation-actuated drum brake as recited in claim 1, wherein the at least one inner brake shoe comprises a pair of inner brake shoes disposed diametrically opposite each other about the annular rim, the at least one arcuate inner slot comprising a pair of arcuate inner slots.

10. The rotation-actuated drum brake as recited in claim 9, wherein the at least one outer brake shoe comprises a pair of outer brake shoes disposed diametrically opposite each other in the annular brake housing, the at least one arcuate outer slot comprising a pair of arcuate outer slots.

11. The rotation-actuated drum brake as recited in claim 10, wherein each of the arcuate inner slots spans an angle $\theta$ with respect to a center of the rotating disc.

12. The rotation-actuated drum brake as recited in claim 11, wherein each of the arcuate outer slots spans the angle $\theta$ with respect to the center of the rotating disc.

13. The rotation-actuated drum brake as recited in claim 12, wherein each of the arcuate inner slots has a first end at a first radial distance from the center of the rotating disc and a second end at a second radial distance from the center of the rotating disc, the first radial distance being less than the second radial distance.

14. The rotation-actuated drum brake as recited in claim 13, wherein the rotating disc has a pair of arcuate intermediate slots defined therein, said actuator having a reciprocating member having a pair of pins disposed in the intermediate slots for selectively driving rotation of the rotating disc.

15. The rotation-actuated drum brake as recited in claim 14, wherein each of the arcuate intermediate slots spans the angle $\theta$ with respect to the center of the rotating disc.

16. The rotation-actuated drum brake as recited in claim 15, wherein the pair of arcuate intermediate slots are arranged asymmetrically with respect to a diameter of the rotating disc.

17. The rotation-actuated drum brake as recited in claim 16, wherein each of the arcuate intermediate slots has a first end at a first radial distance from the center of the rotating disc and a second end at a second radial distance from the center of the rotating disc, the first radial distance being less than the second radial distance.

\* \* \* \* \*